United States Patent
Gao (10) Patent No.: US 8,986,897 B2
(45) Date of Patent: Mar. 24, 2015

(54) FUEL CELL COMPRISING SINGLE LAYER BIPOLAR PLATES, WATER DAMMING LAYERS AND MEA OF DIFFUSION LAYERS LOCALLY TREATED WITH WATER TRANSFERRING MATERIALS, AND INTEGRATING FUNCTIONS OF GAS HUMIDIFICATION, MEMBRANE HYDRATION, WATER REMOVAL AND CELL COOLING

(76) Inventor: Yong Gao, Burnaby (CA)

( * ) Notice: Subject to any disclaimer, the term of this patent is extended or adjusted under 35 U.S.C. 154(b) by 1014 days.

(21) Appl. No.: 11/822,312

(22) Filed: Jul. 5, 2007

(65) Prior Publication Data
US 2008/0020252 A1    Jan. 24, 2008

Related U.S. Application Data

(60) Provisional application No. 60/830,468, filed on Jul. 13, 2006.

(51) Int. Cl.
*H01M 8/06* (2006.01)
*H01M 8/04* (2006.01)
*H01M 8/02* (2006.01)
*H01M 8/10* (2006.01)

(52) U.S. Cl.
CPC ........ *H01M 8/04126* (2013.01); *H01M 8/0241* (2013.01); *H01M 8/0258* (2013.01); *H01M 8/0267* (2013.01); *H01M 8/04007* (2013.01); *H01M 8/1002* (2013.01); *H01M 8/023* (2013.01); *Y02E 60/521* (2013.01)
USPC ............................ 429/414; 429/437; 429/450

(58) Field of Classification Search
USPC ............................... 429/26, 30, 32, 34, 38, 39
See application file for complete search history.

(56) References Cited

U.S. PATENT DOCUMENTS

| | | | |
|---|---|---|---|
| 6,117,577 A * | 9/2000 | Wilson | 429/409 |
| 2004/0058218 A1 * | 3/2004 | Atbi et al. | 429/34 |
| 2005/0208366 A1 * | 9/2005 | Rohwer et al. | 429/44 |
| 2006/0216571 A1 * | 9/2006 | Vyas et al. | 429/38 |

FOREIGN PATENT DOCUMENTS

| | | | | |
|---|---|---|---|---|
| JP | 2005038780 A | * | 2/2005 | |
| JP | 2005116179 A | * | 4/2005 | |

* cited by examiner

*Primary Examiner* — Barbara Gilliam
*Assistant Examiner* — Stephan Essex
(74) *Attorney, Agent, or Firm* — Han IP Corporation; Andy M. Han (57) ABSTRACT

A fuel cell constructed with single layer bipolar plates, water damming layers and membrane electrode assembly with gas diffusion layers locally impregnated with water transporting materials, which has reactant gas flow fields placed on both sides of the single layer plates, while cooling liquid flow fields are integrated at least on one side of the plates. Disclosed novel configuration of the fuel cell provides a united means for humidifying reactant gases, hydrating membrane, removing generated water and cooling cells.

16 Claims, 7 Drawing Sheets

Fig. 5 Contacting surface of the plate channels are rough and scraggy

Fig. 6 Channels are partially open

Fig. 7 Channels are (fully) open

FUEL CELL COMPRISING SINGLE LAYER BIPOLAR PLATES, WATER DAMMING LAYERS AND MEA OF DIFFUSION LAYERS LOCALLY TREATED WITH WATER TRANSFERRING MATERIALS, AND INTEGRATING FUNCTIONS OF GAS HUMIDIFICATION, MEMBRANE HYDRATION, WATER REMOVAL AND CELL COOLING

FIELD OF THE INVENTION

This invention relates to a polymer fuel cell comprising single layer bipolar plates, water damming layers (WDL) and membrane electrode assembly (MEA) of gas diffusion layers (GDL) locally treated with water transferring materials, and integrating functions of gas humidification, membrane hydration, water removal and cell cooling.

BACKGROUND OF THE INVENTION

A fuel cell in this invention refers to a polymer ion membrane fuel cell, "Proton Exchange Membrane fuel cell", a device to generate power through Proton Exchange Membrane (PEM) and Catalyst Layers (CL). This fuel cell can generate power continuously as long as fuel (i.e. hydrogen) is available.

In the core of this PEM fuel cell technology, hydrogen molecular is catalyzed to decompose as proton and electron on one side of PEM called anode side, the proton goes through the PEM to the other side called cathode side, and the electron reaches cathode side through a load with power generated, where the hydrogen proton, electron and oxygen molecular fed directly to cathode side, combine together to be water molecular at cathode side. Therefore, in the fuel cell the hydrogen combines with oxygen to form water with electricity generated and such a process is also seen as reverse of water electrolysis.

PEM is a kind of special material that can conduct proton but can't conduct electronics, it can be in effect only when it's hydrated and the ability of conducting proton is proportionate to the degree of hydration. Gas diffusion layer (GDL) is a porous material which directs reactant gas to the CL through the porous, so it is necessary to keep the porous path clear. It is a dilemma that on one hand enough water is needed to keep PEM hydrated, while on the other hand generated water must be removed to keep the GDL porous path clear. Therefore, one of the key technologies of PEM fuel cell is about water management.

One of the traditional solutions is to humidify reactant gas fed into fuel cells. Not only does this method complicate fuel cell structure, but also is incapable of controlling the humidification degree of the PEM and water removal, since the humidification process could feed more or less than enough water to flood or try cells, while generated water could make flooding worse if not removed effectively.

DISCLOSURE OF THE INVENTION

In accordance with the present invention, there is provided a novel design of a fuel cell constructed with single layer bipolar plates, membrane electrode assembly (MEA) with gas diffusion layers (GDL) locally impregnated with hydrophilic and water transporting materials (for example, a fluorocarbon polymer, etc.), and/or water damming layers (WDL) also treated with hydrophilic and water transporting materials. While the fuel cell integrates reactant gas flow fields on both sides of the plate, upon different needs, humidifying, hydrating and cooling liquid (HHCL) flow fields can be placed on one side or both sides of the single layer plate to achieve functions of gas humidification, membrane hydration, water removal and cell cooling. One of embodiments features the fuel cell constructed with the WDL and locally impregnated GDL stacked together directly in contact with the HHCL flow channels of the plate on one side (WDL side) and catalyst/membrane layers on the other (GDL side), another embodiment has the locally impregnated GDL, without WDL, directly placed underneath the HHCL flow channels of the plates, and another embodiment has WDL placed between the HHCL flow channels and MEA with regular GDL without local treatment for water transport.

Figure 1:
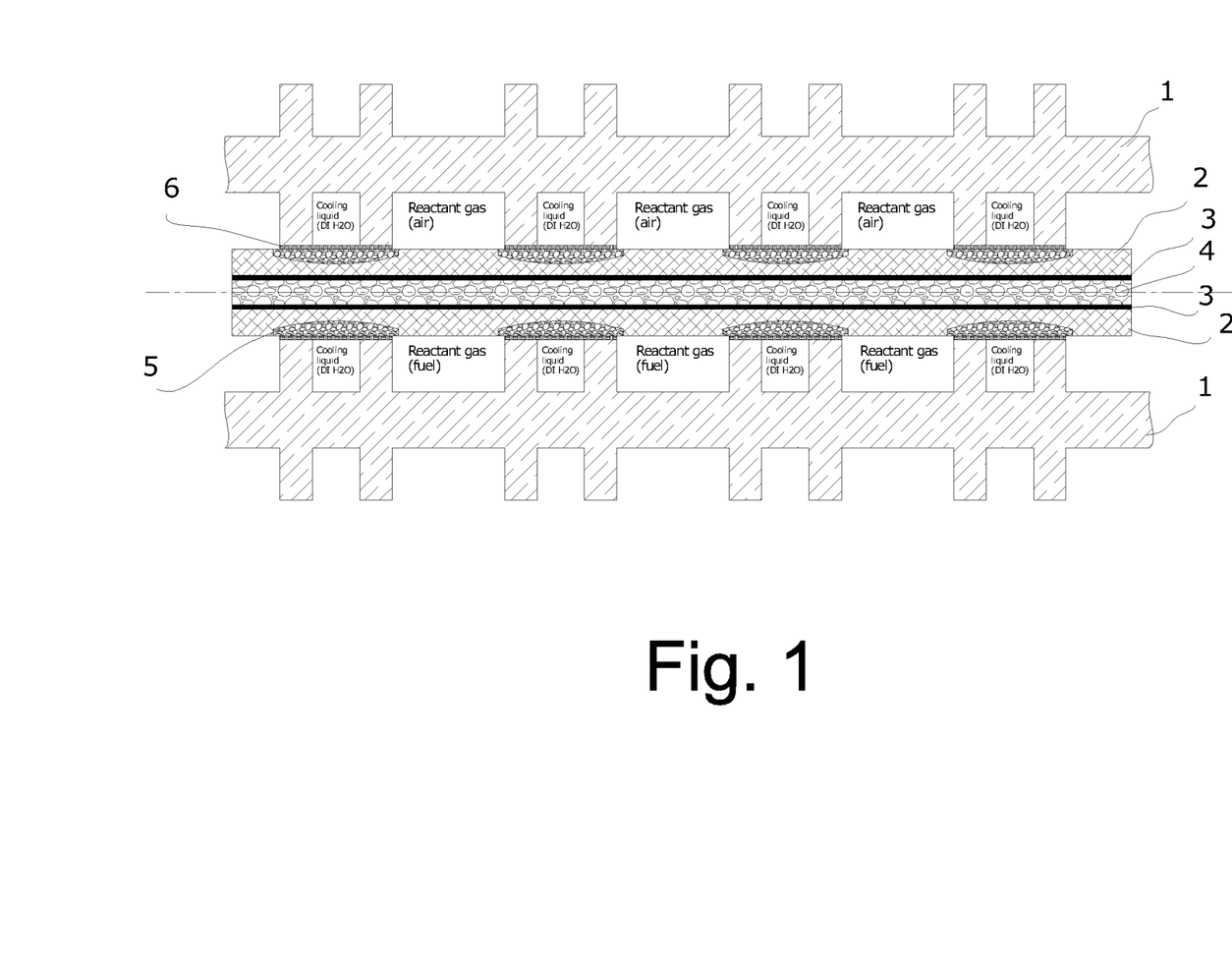
FIG. 1 illustrates a cross sectional, schematic view of the fuel cell having two said single layer plates 1, with plurality of channels on both sides for reactant gas flows and cooling liquid flows, to sandwich water damming layers 6 (WDL) and a membrane electrode assembly (MEA) in between. A schematic view of the MEA is given with a membrane layer 4, two catalyst layers 3 and two gas diffusion layers (GDL) 2 with locally impregnated regions 5 corresponding to the liquid flow channels.
Figure 2A:
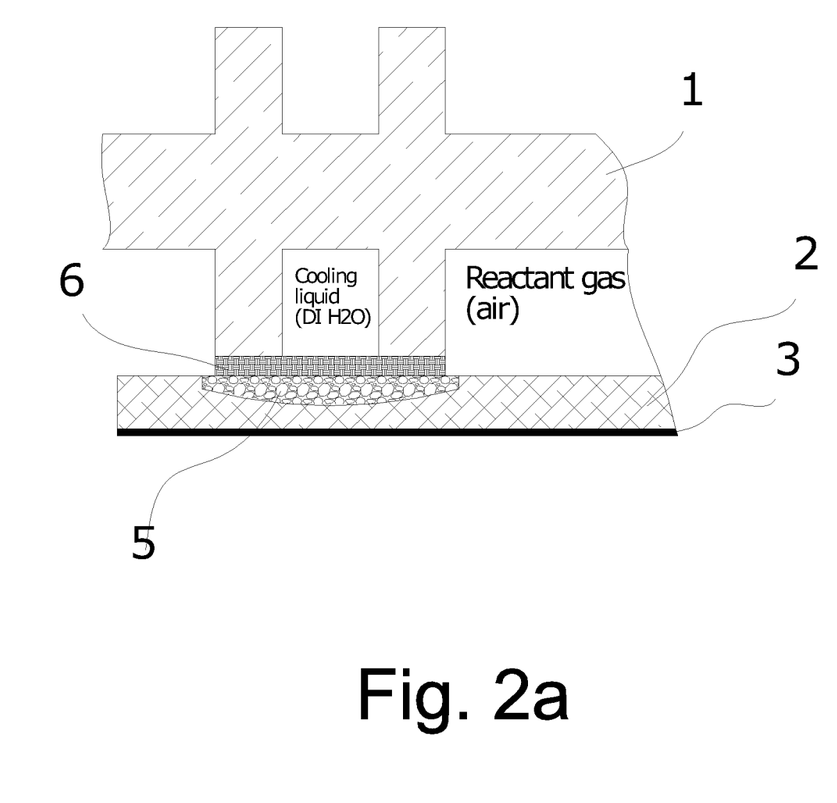
FIG. 2a shows an enlarged cross-sectional, schematic view of one cooling liquid channel on the plate 1 in connection with WDL 6 and region 5 of GDL 2 of the MEA, both of which are treated with water transferring materials.
Figure 2B:
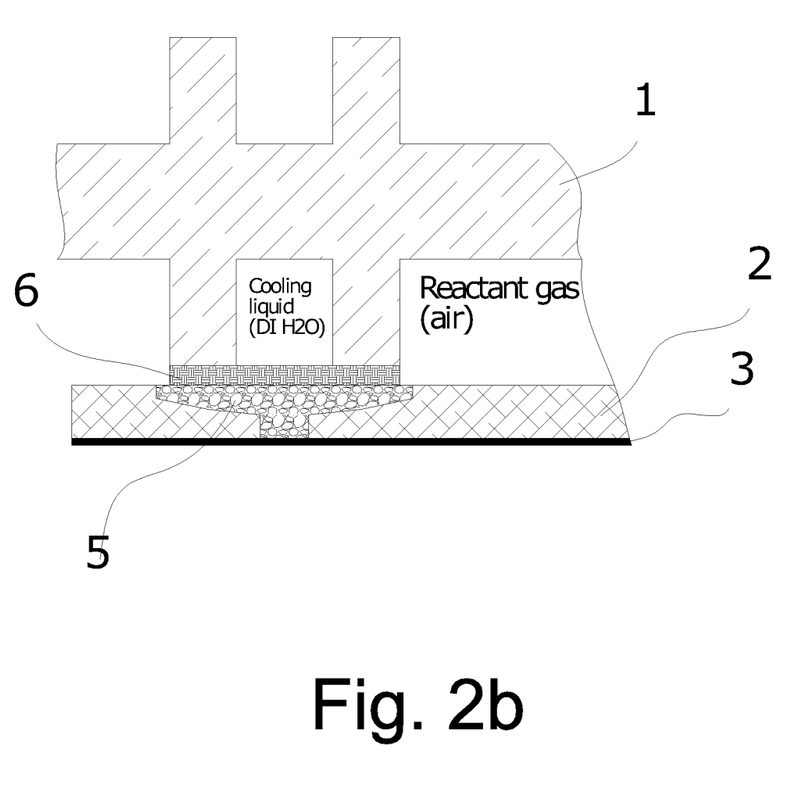
FIG. 2b is mostly the same as FIG. 2a, except the shape of the region 5 which goes deeper down in touch with catalyst layer 3.
Figure 3:
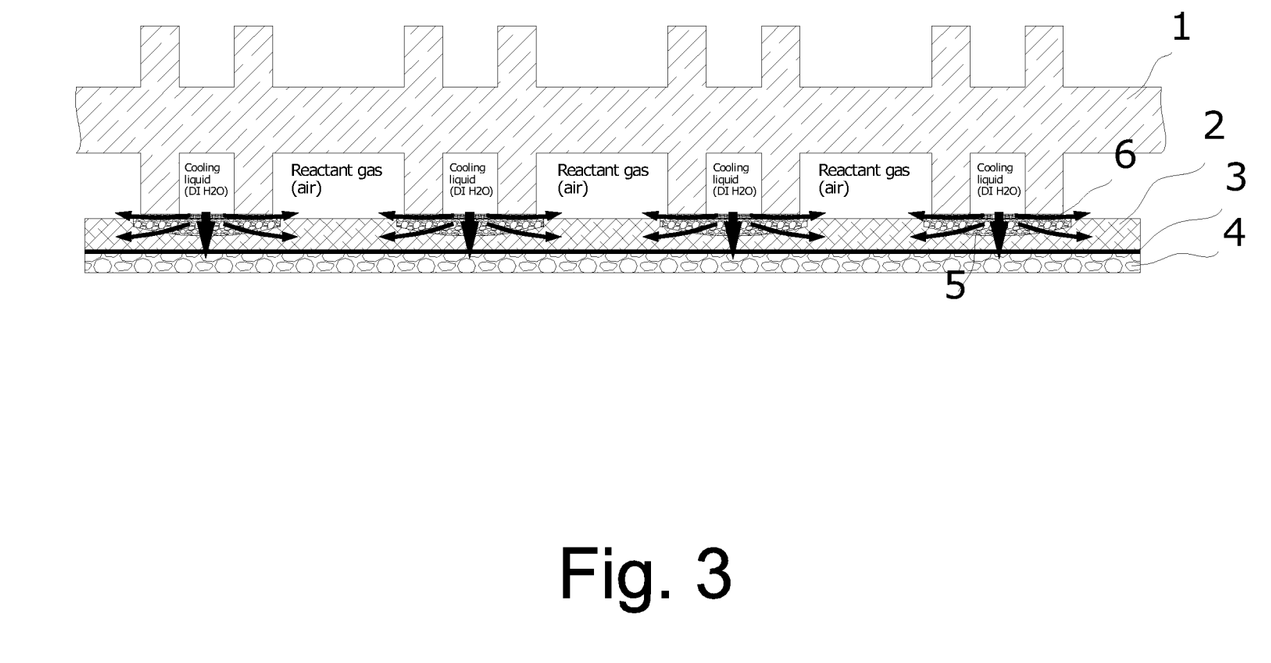
FIG. 3 depicts a cross-sectional, schematic view of a single layer plate 1, a half MEA having catalyst layer 3, membrane 4 and gas diffusion layers (GDL) 2 with locally impregnated regions 5 to illustrate three different humidifying paths of the cooling liquid. One of them is to pass water into reactant flow channels; the second is to humidify reactant right in GDL; the third is to deliver water into catalyst and membrane layers.
Figure 4:
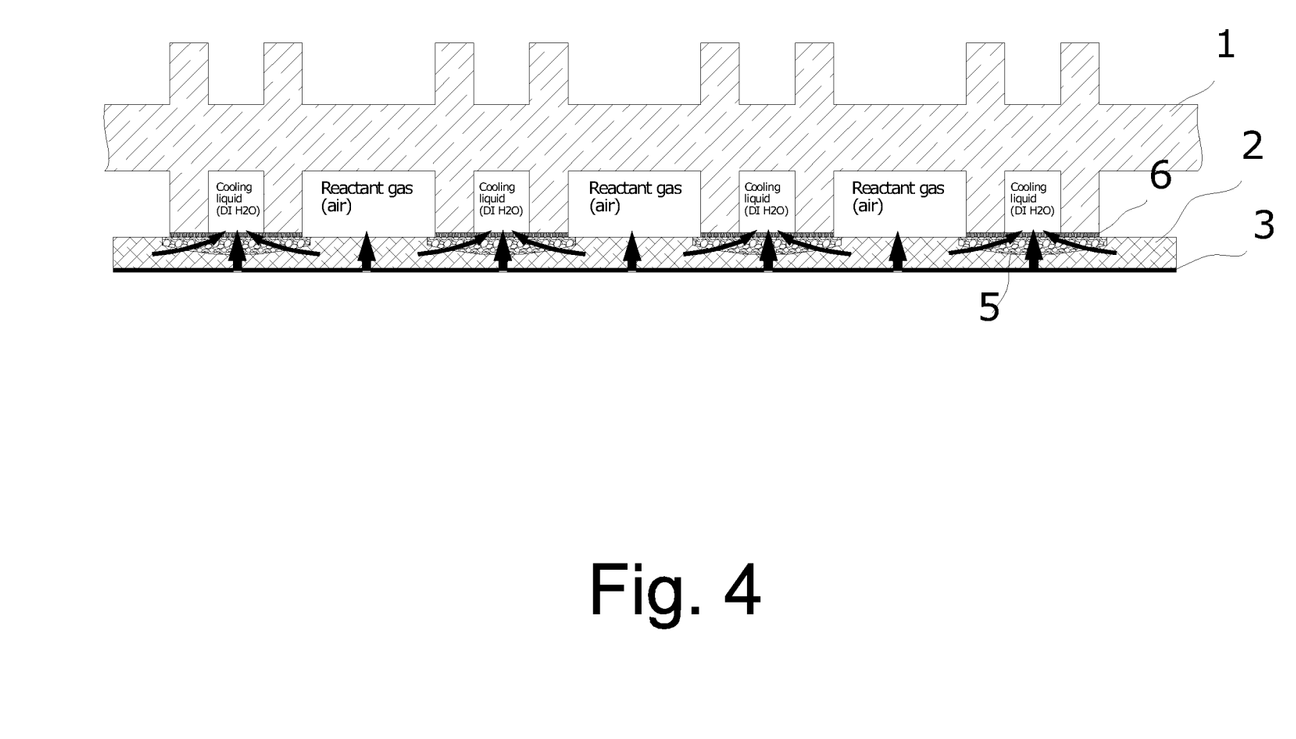
FIG. 4 illustrates a cross-sectional, schematic view of a single layer plate 1, a half MEA having catalyst layer 3 and gas diffusion layers (GDL) 2 with locally impregnated regions 5 to illustrate water removal principles. There are three paths to remove water generated in fuel cell. One of them is the traditional way to let the water go into reactant flow channels; the second is to let water move from GDL under reactant gas flow channels into WDL via the impregnated region of the GDL and then cooling liquid flow channels; the third is to let water move from catalyst layer into GDL under landing then directly into WDL and the impregnated regions of the GDL and then further into cooling liquid flow channels.

In reference to FIG. 1, there is shown a cross sectional, schematic view of the fuel cell having single layer plates 1 fabricated with plurality of reactant (air) flow channels, and HHCL flow channels on one side, and reactant (fuel) flow channels and HHCL flow channels on the other side, and between two plates sandwiched a membrane electrode assembly (MEA) which has catalyst layers 3, membrane 4 and GDL 2 fabricated with local regions 5 impregnated with hydrophilic and water transporting materials, and between regions 5 of GDL 2 and the HHCL flow channels placed with WDL 6 that are also porous medium treated with hydrophilic and water transporting materials, as shown in FIGS. 2a and 2b, so water permeability of the WDL 6 and region 5 is well designed along with certain controlled contact gaps between plates 1, WDL 6 and region 5 to allow required liquid (water) to pass through both ways in or out the HHCL flow channels under adjustable and given pressure difference between HHCL flow channels and reactant flow channels, as shown in FIG. 3 and FIG. 4, to achieve functions of humidifying reactant gases, hydrating membrane, removing excessive water.

FIGS. 2a and 2b give a closer and enlarged cross-sectional, schematic view of one HHCL flow channel on plate 1 and the porous WDL 6 and the impregnated region 5 of GDL 2 of MEA. Plate 1, WDL 6 and MEA with region 5 on GDL 2 are assembled together to achieve and integrate functions of humidifying gases, hydrating membrane, cooling cells and removing water generated in the fuel cell.

As indicated in FIG. 3, not only do liquid flows in the HHCL flow channels act as a cell cooling means, but also provide humidifying water, a part of which flows through WDL 6 into reactant flow channels, where the water becomes a local source for reactant gas humidification in the reactant gas flow channels, a part of which goes through WDL 6 and region 5 of GDL 2, also into other parts of GDL 2, where the water is to humidify reactant flow right in the GDL 2 porous medium, and a part of which penetrates WDL 6 and region 5 of GDL 2 into catalyst layer 3 and membrane layer 4 as a source to hydrate membrane.

As indicated in FIG. 4, in additional to a traditional way to have excessive water generated in electrochemical reaction removed through the reactant flow channels on plate 1, this invention provides a novel means of water removal that by taking advantage of capillary force formed in the porous media WDL 6, region 5 and GDL 2, and by adjusting pressure difference between the HHCL flow channels and reactant gas flow channels, a portion of the excessive water accumulated in region 5 of GDL 2 and WDL 6, due to hydrophilic and water transporting nature of the materials used in region 5 and WDL 6, can be driven into the HHCL flow channels for removal.

Additional explanations to water management principles illustrated in FIG. 3 and FIG. 4 are that the pressure difference adjusting process can be a pulsed or continuous process used in either water supplying direction, as shown in FIG. 3, or water removing direction, as shown in FIG. 4, upon different needs in fuel cell operations.

DETAILED DESCRIPTION OF THE PREFFERRED EMBODIMENT

In accordance with the present invention, there is provided a novel design of a fuel cell constructed with single layer bipolar plates, membrane electrode assembly (MEA) with gas diffusion layers (GDL) locally impregnated with water transferring materials (e.g. a fluorocarbon polymer, etc.), and/or water damming layers (WDL) also treated with water transferring materials. While the fuel cell integrates reactant gas flow fields on both sides of the plates, upon different needs, humidifying, hydrating and cooling water (HHCW) flow fields can be placed on one side or both sides of the single layer plates to achieve functions of gas humidification, membrane hydration, water removal and cell cooling. One of embodiments features the fuel cell constructed with the WDL and locally impregnated GDL stacked together directly in contact with the HHCW flow channels of the plates on one side (WDL side) and catalyst/membrane layers on the other (GDL side), another embodiment has the locally impregnated GDL, without WDL, directly placed underneath the HHCW flow channels of the plates, and another embodiment has WDL placed between the HHCW flow channels and MEA with regular GDL without local treatment for water transport.

Figure 5:
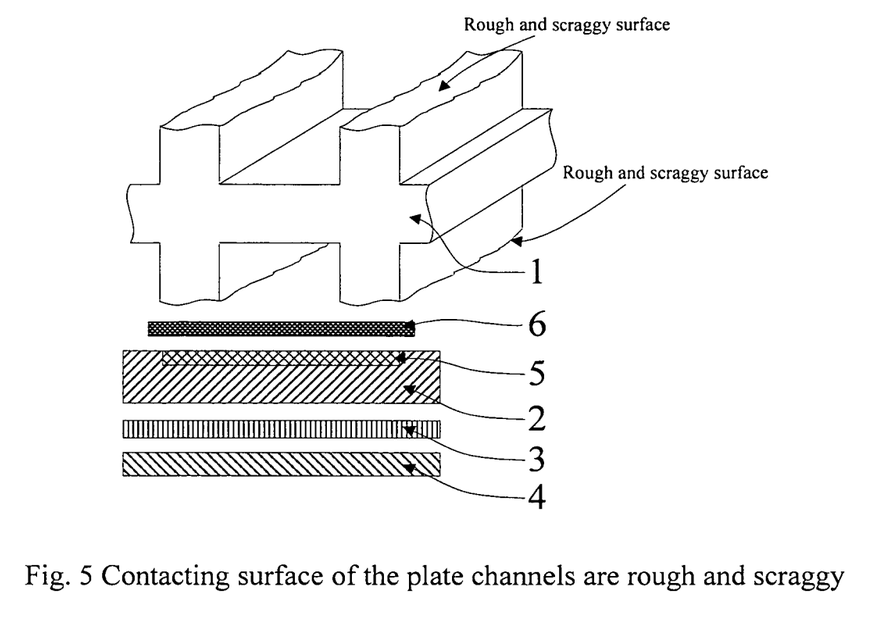
FIG. 5 shows contacting surfaces of the plate channels are rough and scraggy, where the surfaces can be designable based upon different desired pressures.

In reference to FIG. 1, there is shown a cross sectional, schematic view of the fuel cell having single layer plates 1 fabricated with plurality of reactant (air) flow channels, and HHCW flow channels on one side, and reactant (fuel) flow channels and HHCW flow channels on the other side, and between two plates sandwiched a membrane electrode assembly (MEA) which has catalyst layers 3, membrane 4 and GDL 2 fabricated with local regions 5 impregnated with hydrophilic and water transferring materials, and between regions 5 of GDL 2 and the HHCW flow channels placed with WDL 6 that are also porous medium treated with hydrophilic and water transferring materials, as shown in FIGS. 2a and 2b, so water permeability of the WDL 6 and region 5 is well designed along with certain controlled contact gaps between plates 1, WDL 6 and region 5, constructed with a prepared rough or scraggy contacting surfaces on plates 1, as shown in FIG. 5 to allow required liquid (water) to pass through both ways in or out the HHCW flow channels under adjustable and given pressure difference between HHCW flow channels and reactant flow channels, as shown in FIG. 3 and FIG. 4, to achieve functions of humidifying reactant gases, hydrating membrane, removing excessive water.

FIGS. 2a and 2b give a closer and enlarged cross-sectional, schematic view of one HHCW flow channel on plate 1 and the porous WDL 6 and the impregnated region 5 of GDL 2 of MEA. Plate 1, WDL 6 and MEA with region 5 on GDL 2 are assembled together to achieve and integrate functions of humidifying gases, hydrating membrane, cooling cells and removing water generated in the fuel cell.

As indicated in FIG. 3, not only do liquid flows in the HHCW flow channels act as a cell cooling means, but also provide humidifying water, a part of which flows through WDL 6 into reactant flow channels, where the water becomes a local source for reactant gas humidification in the reactant gas flow channels, a part of which goes through WDL 6 and region 5 of GDL 2, also into other parts of GDL 2, where the water is to humidify reactant flow right in the GDL 2 porous medium, and a part of which penetrates WDL 6 and region 5 of GDL 2 into catalyst layer 3 and membrane layer 4 as a source to hydrate membrane.

As indicated in FIG. 4, in additional to a traditional way to have excessive water generated in electrochemical reaction removed through the reactant flow channels on plate 1, this invention provides a novel means of water removal that by taking advantage of capillary force formed in the porous media WDL 6, region 5 and GDL 2, and by adjusting pressure difference between the HHCW flow channels and reactant gas flow channels, a portion of the excessive water accumulated in region 5 of GDL 2 and WDL 6, due to hydrophilic and water transferring nature of the materials used in region 5 and WDL 6, can be driven into the HHCW flow channels for removal.

Additional explanations to water management principles, illustrated in FIG. 3 and FIG. 4, are that the pressure difference adjusting process can be a pulsed or continuous process used in either water supplying direction, as shown in FIG. 3, or water removing direction, as shown in FIG. 4, upon different needs in fuel cell operations.

Figure 6:
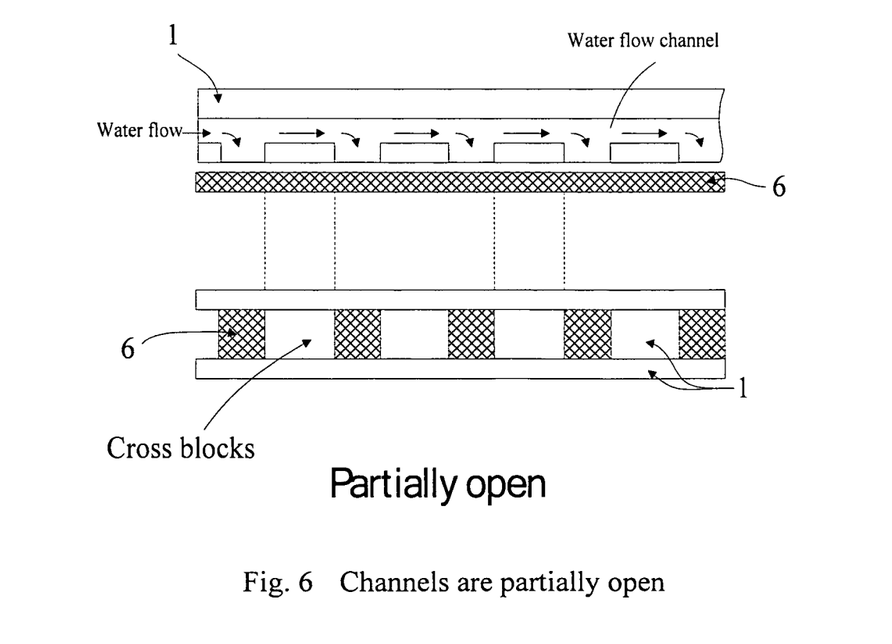
FIG. 6 depicts the channels which are partially open, partially open channels are the ones not fully opened towards WDL 6 and/or GDL 5, where portions of open side of channels towards WDL 6 and/or GDL 5 are obstructed with cross blocks.
Figure 7:
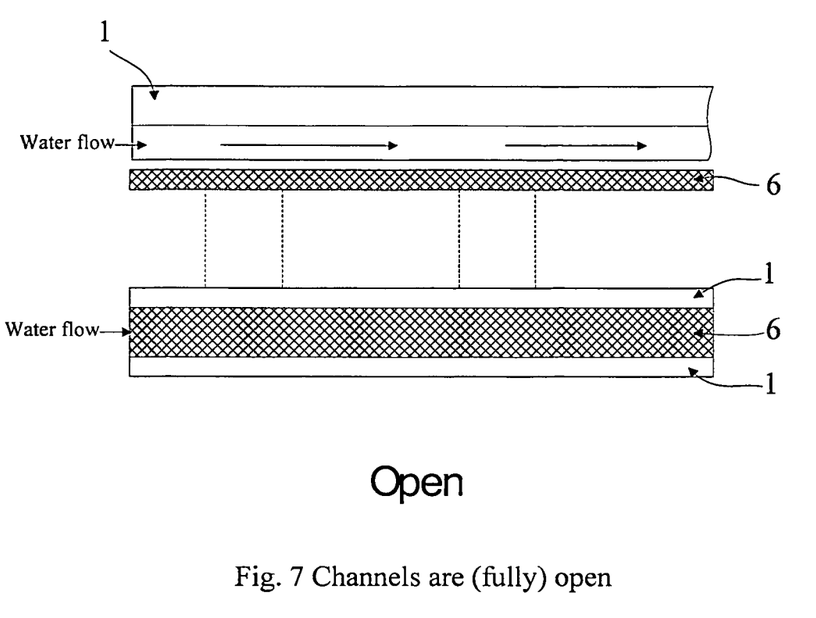
FIG. 7 illustrates the channels are fully open, means that channels are completely open to WDL 6 and/or GDL 5 throughout the flowing process.

Multiple reactant flow channels structured on both anode and cathode sides of the single layer bipolar plates are evenly spaced and segregated, structured open and compressed onto the damming layers WDL 6 and gas diffusion layers 2, while water flow channels structured on either one side or two sides of the single layer bipolar plates are also evenly spaced and segregated, structured open or partially open, and compressed onto the damming layers WDL 6 and/or gas diffusion layers 2, as illustrated in FIG. 6 and FIG. 7.

The invention claimed is:

1. A fuel cell, comprising:
   first and second single type bipolar plates functioning as a cathode and an anode respectively, wherein each of the first and second single type bipolar plates is structured with a first side as the cathode and a second side opposite to the first side as the anode, the first side of each of the first and second single type bipolar plates having a plurality of channels for a first reactant gas flow and a plurality of channels for a first humidifying, hydrating and cooling water (HHCW) flow, the plurality of channels for the first reactant gas flow and the plurality of channels for the first HHCW flow being separated from each other by a plurality of first landings including a plurality of first water damming layers (WDLs) made of porous materials and treated with water transferring materials, and the second side of each of the first and second single type bipolar plates having a plurality of channels for a second reactant gas flow and a plurality of channels for a second HHCW flow, the plurality of channels for the second reactant gas flow and the plurality of channels for the second HHCW flow being separated from each other by a plurality of second landings; and
   a membrane electrode assembly (MEA) sandwiched between the first and second single type bipolar plates with the first side of each of the first and second single type bipolar plate facing the MEA, the MEA comprising:
      a proton exchange membrane (PEM);
      a first gas diffusion layer (GDL) of porous materials on a first side of the PEM, wherein portions of the first GDL are impregnated with hydrophilic and water transferring materials, and wherein an individual portion of the portions of the first GDL impregnated with hydrophilic and water transferring materials is directly disposed underneath an individual first WDL of the plurality of WDLs that is directly disposed underneath an individual channel of the plurality of channels of the first HHCW flow;
      a second GDL of porous materials on a second side of the PEM opposite the first side of the PEM, wherein portions of the second GDL are impregnated with hydrophilic and water transferring materials, and wherein an individual portion of the portions of the second GDL impregnated with hydrophilic and water transferring materials is directly disposed above an individual second WDL of the plurality of WDLs that is directly deposed above an individual channel of the plurality of channels of the second HHCW flow;
      a first catalyst layer sandwiched between the PEM and the first GDL; and
      a second catalyst layer sandwiched between the PEM and the second GDL,
   wherein the portions of the first GDL impregnated with hydrophilic and water transferring materials and a first number of the plurality of WDLs that are on the first side of the MEA are configured to allow the first HHCW flow flowing in the plurality of channels for the first HHCW flow to cool the fuel cell such that:
      a first portion of the first HHCW flow functions as humidifying water that flows through the first number of the plurality of WDLs into the plurality of channels for the first reactant gas flow to humidify the first reactant gas flow;
      a second portion of the first HHCW flow enters into the first GDL through the first number of the plurality of WDLs and the portions of the first GDL impregnated with hydrophilic and water transferring materials to humidify a reactant flow in the porous materials of the first GDL; and
      a third portion of the first HHCW flow penetrates the first number of the plurality of WDLs and the portions of the first GDL impregnated with hydrophilic and water transferring materials into the first catalyst layer and the PEM to hydrate the PEM,
   wherein the portions of the second GDL impregnated with hydrophilic and water transferring materials and a second number of the plurality of WDLs that are on the second side of the MEA are configured to allow the second HHCW flow flowing in the plurality of channels for the second HHCW flow to cool the fuel cell such that:
      a first portion of the second HHCW flow functions as humidifying water that flows through the second number of the plurality of WDLs into the plurality of channels for the first reactant gas flow to humidify the second reactant gas flow;
      a second portion of the second HHCW flow enters into the second GDL through the second number of the plurality of WDLs and the portions of the second GDL impregnated with hydrophilic and water transferring materials to humidify a reactant flow in the porous materials of the second GDL; and
      a third portion of the second HHCW flow penetrates the second number of the plurality of WDLs and the portions of the second GDL impregnated with hydrophilic and water transferring materials into the second catalyst layer and the PEM to hydrate the PEM,
   wherein water of the first HHCW flow is removed by at least the following:
      a capillary force formed in the portions of the first GDL impregnated with hydrophilic and water transferring materials, the first number of the plurality of WDLs, and the first GDL; and
      a pressure difference between the plurality of channels for the first HHCW flow and the plurality of channels for the first reactant gas flow, and
   wherein water of the second HHCW flow is removed by at least the following:
      a capillary force formed in the portions of the second GDL impregnated with hydrophilic and water transferring materials, the second number of the plurality of WDLs, and the second GDL; and
      a pressure difference between the plurality of channels for the second HHCW flow and the plurality of channels for the second reactant gas flow.

2. The fuel cell as recited in claim 1, wherein the channels for the first reactant gas flow and the channels for the first HHCW flow on the first side of the first single type bipolar plate are evenly spaced and segregated, and are connected or partially connected to the first GDL having a rough or scraggy contact surface by compression so as to make contact gaps formed therebetween controllable for water entrance and exit by pressure difference between the channels for the first reactant gas flow and the channels for the first HHCW flow.

3. The fuel cell as recited in claim 1, wherein the channels for the second reactant gas flow and the channels for the second HHCW flow on the second side of the second single type bipolar plate are evenly spaced and segregated, and are connected or partially connected to the second GDL having a rough or scraggy contact surface by compression so as to make contact gaps formed therebetween controllable for water entrance and exit by pressure difference between channels for the second reactant gas flow and channels for the second HHCW flow.

4. The fuel cell as recited in claim 1, wherein the first GDL is made of electrically conductive porous materials, and wherein portions of the first GDL in contact with the channels for the first HHCW flow, the first landings and portions of the channels for the first reactant gas flow are locally treated with hydrophilic and water transferring materials as reactant and water flow path.

5. The fuel cell as recited in claim 1, wherein the second GDL is made of electrically conductive porous materials, and wherein portions of the second GDL in contact with the channels for the second HHCW flow, the second landings, and portions of the channels for the second reactant gas flow are locally treated with hydrophilic and water transferring materials as reactant and water flow path.

6. The fuel cell as recited in claim 1, wherein the plurality of channels for first HHCW flow are connected to the plurality of first WDLs and the first GDL in an open or partially open manner, and wherein the plurality of channels for second HHCW flow are connected to the plurality of second WDLs and the second GDL in an open or partially open manner.

7. The fuel cell as recited in claim 1, wherein the individual first WDL of the plurality of first WDLs covers an entire surface of an individual landing of the plurality of first landings, and the individual second WDL of the plurality of first WDLs covers an entire surface of an individual landing of the plurality of second landings.

8. A fuel cell, comprising:
  first and second single type bipolar plates functioning as a cathode and an anode respectively, wherein each of the first and second single type bipolar plates is structured with a first side as the cathode and a second side opposite to the first side as the anode, the first side of each of the first and second single type bipolar plates having a plurality of channels for a first reactant gas flow and a plurality of channels for a first humidifying, hydrating and cooling water (HHCW) flow, the plurality of channels for the first reactant gas flow and the plurality of channels for the first HHCW flow being separated from each other by a plurality of first landings including a plurality of first water damming layers (WDLs) made of porous materials and treated with water transferring materials, and the second side of each of the first and second single type bipolar plates having a plurality of channels for a second reactant gas flow and a plurality of channels for a second HHCW flow, the plurality of channels for the second reactant gas flow and the plurality of channels for the second HHCW flow being separated from each other by a plurality of second landings; and
  a membrane electrode assembly (MEA) sandwiched between the first and second single type bipolar plates with the first side of each of the first and second single type bipolar plate facing the MEA, the MEA comprising:
    a proton exchange membrane (PEM);
    a first gas diffusion layer (GDL) of porous materials on a first side of the PEM, wherein portions of the first GDL are impregnated with hydrophilic and water transferring materials, and wherein an individual portion of the portions of the first GDL impregnated with hydrophilic and water transferring materials is directly disposed underneath an individual first WDL of the plurality of first WDLs that is directly disposed underneath an individual channel of the plurality of channels of the first HHCW flow;
    a second GDL of porous materials on a second side of the PEM opposite the first side of the PEM, wherein portions of the second GDL are impregnated with hydrophilic and water transferring materials, wherein an individual portion of the portions of the second GDL impregnated with hydrophilic and water transferring materials is directly disposed above an individual second WDL of the plurality of WDLs that is directly deposed above an individual channel of the plurality of channels of the second HHCW flow, wherein the individual first WDL of the plurality of WDLs covers an entire surface of an individual landing of the plurality of first landings, and wherein the individual second WDL of the plurality of WDLs covers an entire surface of an individual landing of the plurality of second landings;
    a first catalyst layer sandwiched between the PEM and the first GDL; and
    a second catalyst layer sandwiched between the PEM and the second GDL,
  wherein the portions of the first GDL impregnated with hydrophilic and water transferring materials and a first number of the plurality of WDLs that are on the first side of the MEA are configured to allow the first HHCW flow flowing in the plurality of channels for the first HHCW flow to cool the fuel cell such that:
    a first portion of the first HHCW flow functions as humidifying water that flows through the first number of the plurality of WDLs into the plurality of channels for the first reactant gas flow to humidify the first reactant gas flow;
    a second portion of the first HHCW flow enters into the first GDL through the first number of the plurality of WDLs and the portions of the first GDL impregnated with hydrophilic and water transferring materials to humidify a reactant flow in the porous materials of the first GDL; and
    a third portion of the first HHCW flow penetrates the first number of the plurality of WDLs and the portions of the first GDL impregnated with hydrophilic and water transferring materials into the first catalyst layer and the PEM to hydrate the PEM,
  wherein the portions of the second GDL impregnated with hydrophilic and water transferring materials and a second number of the plurality of WDLs that are on the second side of the MEA are configured to allow the second HHCW flow flowing in the plurality of channels for the second HHCW flow to cool the fuel cell such that:
    a first portion of the second HHCW flow functions as humidifying water that flows through the second number of the plurality of WDLs into the plurality of channels for the first reactant gas flow to humidify the second reactant gas flow;
    a second portion of the second HHCW flow enters into the second GDL through the second number of the plurality of WDLs and the portions of the second GDL impregnated with hydrophilic and water transferring materials to humidify a reactant flow in the porous materials of the second GDL; and a third portion of the second HHCW flow penetrates the second number of the plurality of WDLs and the portions of the second GDL impregnated with hydrophilic and water transferring materials into the second catalyst layer and the PEM to hydrate the PEM, wherein water of the first HHCW flow is removed by at least the following:

a capillary force formed in the portions of the first GDL impregnated with hydrophilic and water transferring materials, the first number of the plurality of WDLs, and the first GDL; and a pressure difference between the plurality of channels for the first HHCW flow and the plurality of channels for the first reactant gas flow, and wherein water of the second HHCW flow is removed by at least the following:

a capillary force formed in the portions of the second GDL impregnated with hydrophilic and water transferring materials, the second number of the plurality of WDLs, and the second GDL; and a pressure difference between the plurality of channels for the second HHCW flow and the plurality of channels for the second reactant gas flow.

9. The fuel cell as recited in claim 8, wherein the channels for the first reactant gas flow and the channels for the first HHCW flow on the first side of the first single type bipolar plate are evenly spaced and segregated, and are connected or partially connected to the first WDLs and the first GDL having a rough or scraggy contacting surface by compression so as to make contact gaps formed therebetween controllable for water entrance and exit by pressure difference between the channels for the first reactant gas flow and the channels for the first HHCW flow.

10. The fuel cell as recited in claim 8, wherein the channels for the second reactant gas flow and the channels for the second HHCW flow on the second side of the second single type bipolar plate are evenly spaced and segregated, and are connected or partially connected to the second WDLs and the second GDL having a rough or scraggy contacting surfaces by compression so as to make contact gaps formed therebetween controllable for water entrance and exit by pressure difference between the channels for the second reactant gas flow and the channels for the second HHCW flow.

11. The fuel cell as recited in claim 8, wherein the first GDL is made of electrically conductive porous materials.

12. The fuel cell as recited in claim 8, wherein the second GDL is made of electrically conductive porous materials.

13. The fuel cell as recited in claim 8, wherein the plurality of channels for first HHCW flow are connected to the plurality of first WDLs and the first GDL in an open or partially open manner, and wherein the plurality of channels for second HHCW flow are connected to the plurality of second WDLs and the second GDL in an open or partially open manner.

14. A fuel cell, comprising:

first and second single type bipolar plates functioning as a cathode and an anode respectively, wherein each of the first and second single type bipolar plates is structured with a first side as the cathode and a second side opposite to the first side as the anode, the first side of each of the first and second single type bipolar plates having a plurality of channels for a first reactant gas flow and a plurality of channels for a first humidifying, hydrating and cooling water (HHCW) flow, the plurality of channels for the first reactant gas flow and the plurality of channels for the first HHCW flow being separated from each other by a plurality of first landings including a plurality of water damming layers (WDLs) made of porous materials and treated with water transferring materials, and the second side of each of the first and second single type bipolar plates having a plurality of channels for a second reactant gas flow, the plurality of channels for the second reactant gas flow being separated from each other by a plurality of second landings; and a membrane electrode assembly (MEA) sandwiched between the first and second single type bipolar plates with the first side of each of the first and second single type bipolar plate facing the MEA, the MEA comprising:

a proton exchange membrane (PEM); a first gas diffusion layer (GDL) of porous materials on a first side of the PEM, wherein portions of the first GDL are impregnated with hydrophilic and water transferring materials, wherein an individual portion of the portions of the first GDL impregnated with hydrophilic and water transferring materials is directly disposed underneath an individual first WDL of the plurality of first WDLs that is directly disposed underneath an individual channel of the plurality of channels of the first HHCW flow, and wherein the plurality of channels for first HHCW flow are connected onto the plurality of first WDLs and the first GDL in an open or partially open manner;

a second GDL of porous materials on a second side of the PEM opposite the first side of the PEM, wherein portions of the second GDL are impregnated with hydrophilic and water transferring materials, wherein an individual portion of the portions of the second GDL impregnated with hydrophilic and water transferring materials is directly disposed above an individual second WDL of the plurality of WDLs that is directly deposed above an individual channel of the plurality of channels of the second HHCW flow, and wherein the plurality of channels for first HHCW flow are connected onto the plurality of first WDLs and the first GDL in an open or partially open manner;

a first catalyst layer sandwiched between the PEM and the first GDL; and a second catalyst layer sandwiched between the PEM and the second GDL, wherein the portions of the first GDL impregnated with hydrophilic and water transferring materials and a first number of the plurality of WDLs that are on the first side of the MEA are configured to allow the first HHCW flow flowing in the plurality of channels for the first HHCW flow to cool the fuel cell such that:

a first portion of the first HHCW flow functions as humidifying water that flows through the first number of the plurality of WDLs into the plurality of channels for the first reactant gas flow to humidify the first reactant gas flow;

a second portion of the first HHCW flow enters into the first GDL through the first number of the plurality of WDLs and the portions of the first GDL impregnated with hydrophilic and water transferring materials to humidify a reactant flow in the porous materials of the first GDL; and a third portion of the first HHCW flow penetrates the first number of the plurality of WDLs and the portions of the first GDL impregnated with hydrophilic and water transferring materials into the first catalyst layer and the PEM to hydrate the PEM, wherein the portions of the second GDL impregnated with hydrophilic and water transferring materials and a second number of the plurality of WDLs that are on the second side of the MEA are configured to allow the second HHCW flow flowing in the plurality of channels for the second HHCW flow to cool the fuel cell such that:

a first portion of the second HHCW flow functions as humidifying water that flows through the second number of the plurality of WDLs into the plurality of channels for the first reactant gas flow to humidify the second reactant gas flow;

a second portion of the second HHCW flow enters into the second GDL through the second number of the plurality of WDLs and the portions of the second GDL impregnated with hydrophilic and water transferring materials to humidify a reactant flow in the porous materials of the second GDL; and a third portion of the second HHCW flow penetrates the second number of the plurality of WDLs and the portions of the second GDL impregnated with hydrophilic and water transferring materials into the second catalyst layer and the PEM to hydrate the PEM, wherein water of the first HHCW flow is removed by at least the following:

a capillary force formed in the portions of the first GDL impregnated with hydrophilic and water transferring materials, the first number of the plurality of WDLs, and the first GDL; and a pressure difference between the plurality of channels for the first HHCW flow and the plurality of channels for the first reactant gas flow, and wherein water of the second HHCW flow is removed by at least the following:

a capillary force formed in the portions of the second GDL impregnated with hydrophilic and water transferring materials, the second number of the plurality of WDLs, and the second GDL; and a pressure difference between the plurality of channels for the second HHCW flow and the plurality of channels for the second reactant gas flow.

15. The fuel cell as recited in claim 14, wherein the channels for the first reactant gas flow and the channels for the first HHCW flow on the first side of the first single type bipolar plate are evenly spaced and segregated, and are connected or partially connected to the first WDLs and the first GDL having a rough or scraggy contact surface by compression so as to make contact gaps formed therebetween controllable for water entrance and exit by pressure difference between channels for the first reactant gas flow and channels for the first HHCW flow.

16. The fuel cell as recited in claim 14, wherein the individual first WDL of the plurality of first WDLs covers an entire surface of an individual landing of the plurality of first landings, and the individual second WDL of the plurality of first WDLs covers an entire surface of an individual landing of the plurality of second landings.

* * * * *